United States Patent Office 2,812,314
Patented Nov. 5, 1957

2,812,314
CALCIUM AND ALKALI METAL DOUBLE SALTS OF HYDROLYZED POLYACRYLONITRILE

Costas H. Basdekis, Longmeadow, Mass., assignor to Monsanto Chemical Company, St. Louis, Mo., a corporation of Delaware No Drawing. Application August 23, 1952, Serial No. 306,062

10 Claims. (Cl. 260—80)

This invention relates to new polymeric compositions having unusual physical and chemical properties. More specifically the invention relates to new chemical compounds having superior properties with respect to inducing aggregation in agricultural soils.

In copending application, Serial No. 300,354, filed August 8, 1952, by Costas H. Basdekis, there are described and claimed calcium salts of partially hydrolyzed acrylonitrile polymers and methods for their preparation by partial hydrolysis reactions. These calcium salts of a specific degree of hydrolysis are useful soil conditioning agents but those of more complete hydrolysis as well as those of a lower degree of hydrolysis are of little value in aggregating soils. In other words, if the hydrolysis is complete and the compositions have less than 3.5 percent nitrogen the compounds are too insoluble for conditioning soils. Similarly if the hydrolysis is not conducted at least to the point where the polymer has less than 5.5 percent nitrogen the compounds are also too insoluble to be of any use for the said purpose. Water-solubility is a necessary characteristic of useful polymers because the chemical or physical reaction between the polymers and the clay particles takes place in the medium of the soil moisture.

The primary purpose of this invention is to provide a method of improving the utility of the compounds described and claimed in the application, Serial No. 300,354, identified above. A further purpose of the invention is to provide a means of using the calcium salts of the more completely and less completely hydrolyzed acrylonitrile polymers as well as the calcium salts of polyacrylic acid when made by the polymerization of calcium acrylate or by the precipitation of polyacrylic acid by means of soluble calcium salts. A still further purpose of this invention is to prepare new and improved calcium polyacrylates irrespective of the extent of hydrolysis.

It has been found that the calcium salts of hydrolyzed acrylonitrile polymers and the calcium polyacrylates prepared by other methods may be substantially improved with respect to their utility as soil conditioning agents if some of the calcium ions are replaced with sodium, potassium or ammonium ions. In other words the mixed or double salts of calcium and the said other ions are more effective than either the unsubstituted calcium salts or the unsubstituted potassium, sodium, or ammonium salts.

The new mixed salts may be represented by the following structural formula:

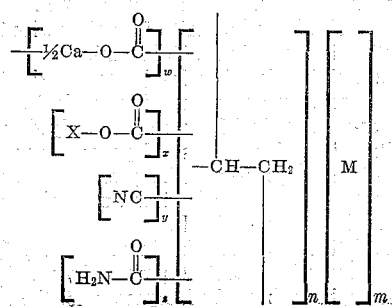

wherein X is a radical of the group consisting of ammonium, potassium, and sodium, wherein $w$, $x$, $y$, and $z$ are integers representing the numbers of the respective substituents on the polymer molecule, $w$ and $x$ being greater than zero (0), wherein M is a molecular grouping derived by polymerization of a comonomer, wherein $n$ is an integer representing the number of principal monomer units in the polymer, wherein $m$ is an integer representing the number of comonomer units in the molecule, $n$ being substantially greater than $m$, and the sum of $w$, $x$, $y$, and $z$ being equal to $n$.

The new chemical compounds may be prepared by a variety of methods. The compounds may be prepared from the calcium salts by ion exchange with any soluble sodium, potassium, or ammonium salts or mixtures thereof. Alternatively the compounds may be prepared by hydrolyzing acrylonitrile polymers in the presence of calcium hydroxide and either a hydroxide of an alkali metal or ammonium hydroxide. Alternatively the double salts may be prepared in the soil by adding dry mixtures of the calcium polyacrylates and solid ammonium, potassium, or sodium salts, in which case the ion exchange reaction takes place in the medium of the soil moisture and the same effect of the addition of the double salts to the soil is achieved. A still further method of preuaring the double salts involves the addition of the calcium salts to saline soils or alkaline soils containing substantial quantities of sodium ions. When the polymeric calcium salts are prepared by the hydrolysis of acrylonitrile polymers, the hydrolysis should be continued until at least 40 percent of the original cyano groups are hydrolyzed and the nitrogen content evolved as ammonia. Compounds of this degree of hydrolysis are necessary if they are to be converted to water-soluble double salts by ion exchange with alkali metal or ammonium compounds.

The most convenient method of preparing double salts and a method of greater practical importance because the conditioning effect is noticed sooner involves the treatment of the calcium salts of hydrolyzed acrylonitrile polymers of either the soluble or insoluble type with a soluble potassium, sodium, or ammonium salt in a large excess of water. In the case of insoluble calcium polyacrylates an immediate dissolution or conversion to a soluble form will be observed. Similarly the improvement of a water-soluble calcium salt will be benefited by a reduction in the apparent viscosity of the medium. The new double salts may be used in the aqueous medium in which they are prepared or they may be separated for use as solid polymers.

In additifion to use as soil conditioning agents the new compounds may be used in the stabilization of aqueous polymer emulsions, as components of adhesives, or coating compositions, as wood sealers, or in other industrial applications requiring the properties of water-solubility and ion dispersing effects.

Further details of the preparation and use of the new double salts are set forth with respect to specific examples. In these examples the utility of the compounds as soil conditioning agents was measured by the wet screening technique, which involves the preparation of soil crumbs by mixing very small proportions of the polymer with the soil (Miami silt loam) and sufficient water to make the soil plastic and thereafter pressing the soft mixture through a screen with a four mm. aperture. The soil crumbs so prepared were dried and their water-stability determined by placing a measured quantity on the top of a set of three sieves, with apertures of 0.84 mm., 0.42 mm., and 0.25 mm., arranged in order of the decreasing size. The set of sieves was raised and lowered in a water bath through a distance of 1.5 inches at the rate of 30 cycles per minute for a period of thirty minutes. The proportion of soil crumbs remaining on the three screens was used as a measurement of the water-stability of the soil crumbs.

Two modifications of the wet screening procedure were used. One, known as the wet mix, involved the mixing of the polymer or polymer components first with water and then mixing the solution with the soil. In the other method, known as the dry mix method, the soil and solid polymers are mixed and thereafter the water is applied to form the soil crumbs. Differences observed by the two methods are due primarily to the variation in the thoroughness of the soil polymer mixing, the wet mix method giving the highest values and representing the ultimate aggregation after diffusion throughout the soil mass is complete, and the dry mix method showing the immediate aggregation obtained in the usual soil conditioning procedures.

EXAMPLE 1

A sample of polyacrylonitrile was hydrolyzed with 75 percent of the stoichiometric equivalent of calcium hydroxide in a thin aqueous slurry. The reaction was continued to substantial completion at which time the nitrogen content was 4.37 percent by weight. The calcium salt was separated from the reaction mixture and blended in aqueous slurry with various proportions of a polymeric sodium salt prepared by the hydrolysis of polyacrylonitrile with sodium hydroxide. The double salts thus formed had quite different solubility characteristics than the calcium salts, being of much lower viscosity and more useful in aggregating soils than either the sodium salt or the calcium salt. The following table sets forth the composition of the double salts and their soil aggregating properties by the wet mix method.

Table I

| Compound | Na/Ca Ratio | Percent Water-Stable Aggregates | |
|---|---|---|---|
| | | 0.025 wt. percent | 0.063 wt. percent |
| Sodium salt | ∞ | 50 | 74.3 |
| Double salt | 3.1 | 53.8 | 75.0 |
| Do | 1.04 | 63.3 | 79.8 |
| Do | 0.7 | 58.5 | 80.0 |
| Calcium salt | 00 | [1] 40 | 66.0 |

[1] Approximately.

EXAMPLE 2

The same samples were evaluated with the dry method, the slightly lower figures show that in some cases there was incomplete mixing or incomplete reaction to form the double salt.

Table II

| Compound | Na/Ca Ratio | Percent Water-Stable Aggregates, 0.063 wt. percent |
|---|---|---|
| Sodium salt | ∞ | 63.5 |
| Double salt | 3.1 | 75 |
| Do | 1.04 | 72.8 |
| Do | 0.7 | 68.5 |
| Calcium salt | 0 | 65 |

EXAMPLE 3

Double salts were prepared by mixing sodium carbonate with calcium polyacrylate solutions (75 percent hydrolysis). After the mixing the gel type solutions were converted into thin watery solutions, which were cloudy due to the precipitated calcium carbonate. Double salts were prepared with various sodium-calcium ratios and were evaluated by the wet test method. The following Table III demonstrates the relationship of the double salt composition to effectiveness in aggregating Miami silt loam soil.

Table III

| Polymer | Ca/Na Weight Ratio | Percent Water-Stable Aggregates | |
|---|---|---|---|
| | | 0.025 | 0.063 |
| Calcium salt | 0 | | 66 |
| Double salt | 1.8 | 67.3 | 85.3 |
| Do | 2.4 | 70.8 | 82.3 |
| Do | 3.6 | 72 | 82.0 |

EXAMPLE 4

Another series of samples were prepared by hydrolyzing polyacrylonitrile to various nitrogen contents and the soil aggregating properties were measured by the wet technique, both originally and after conversion to the double salt by reaction in solution with an equivalent proportion of sodium carbonate. The Table IV sets forth the aggregating properties of the double salts and the calcium salts, and demonstrates the relationship of nitrogen content and extent of hydrolysis on the effectiveness of the polymer. Another sample of calcium polyacrylate with no nitrogen was prepared from calcium acrylate by polymerization and evaluated in the identical manner.

Table IV

| Percent Nitrogen by Weight | Percent of Original Nitrogen Hydrolyzed | Aggregation | |
|---|---|---|---|
| | | 0.063 Wt. Percent Ca Salt | Equi. Quan. Double Salt |
| 0 | -------- | 1.0 | 56.0 |
| 2.5 | 85 | 6.5 | 76.0 |
| 4.4 | 75 | 66.0 | 82.0 |
| 5.25 | 65 | 16.5 | 86.0 |
| 5.75 | 63 | 7.5 | 76.0 |
| 6.5 | 61 | 2.5 | 67.0 |
| 11.06 | 42 | 1.0 | 30.0 |

The expression, "water-soluble," as used throughout the specification is intended in the broad sense, and includes non-Newtonian solutions as well as the so-called "true solutions." Thus, the water-soluble polymers will include those which can be swollen by water to an infinite extent, and these are considered completely water-soluble. Other polymers which are swollen by water to a substantial but limited extent are termed "partially water-soluble." The solubility is evidenced by the capacity of the polymer-water composition for aggregating soil, since the ability to adsorb on the soil and manifest a substantial increase in the proportion of water-stable aggregates therein depends upon the hydrophilic molecular dispersibility of the polymer in the soil water, whereby polymeric ions are formed. This solubility is regarded as necessary for the diffusion of the polymer mass through the soil moisture to attain optimum soil aggregation.

What I claim is:

1. A water-soluble double salt of polyacrylic acid and both calcium and radicals selected from the group consisting of sodium, potassium, and ammonium.

2. A water-soluble double salt of a polymerized acrylic acid and both calcium and an alkali metal.

3. A water-soluble double salt of a polymerized acrylic acid and both calcium and ammonium radicals.

4. A water-soluble double salt of hydrolyzed polymer of acrylonitrile in which at least 40 percent by weight of the nitrile radicals have been hydrolyzed and the nitrogen thereof converted to and evolved as ammonia, and both calcium and alkali metal radicals.

5. A water-soluble double salt of hydrolyzed polymer of acrylonitrile in which at least 40 percent by weight of the nitrile radicals have been hydrolyzed and the nitrogen thereof converted to and evolved as ammonia, and both calcium and ammonium radicals.

6. A water-soluble double salt of a polymer of acrylic acid and both calcium and radicals selected from the group consisting of sodium, potassium, and ammonium, the proportion of calcium ions being from 25 to 75 percent by weight of the total cationic substituents.

7. A water-soluble double salt of a polymerized acrylic acid and both calcium and an alkali metal, the proportion of calcium ions being from 25 to 75 percent by weight of the total cationic substituents.

8. A water-soluble double salt of a polymerized acrylic acid and both calcium and ammonium radicals, the proportion of calcium ions being from 25 to 75 percent by weight of the total cationic substituents.

9. A water-soluble double salt of hydrolyzed polymer of acrylonitrile in which at least 40 percent by weight of the nitrile radicals have been hydrolyzed and the nitrogen thereof converted to and evolved as ammonia, and both calcium and alkali metal radicals, the proportion of calcium ions being from 25 to 75 percent by weight of the total cationic substituents.

10. A water-soluble double salt of hydrolyzed polymer of acrylonitrile in which at least 40 percent by weight of the nitrile radicals have been hydrolyzed and the nitrogen thereof converted to and evolved as ammonia, and both calcium and ammonium radicals, the proportion of calcium ions being from 25 to 75 percent by weight of the total cationic substituents.

References Cited in the file of this patent
UNITED STATES PATENTS 1,984,417    Mark et al. _____ Dec. 18, 1934